US009602347B2

(12) United States Patent
Chen et al.

(10) Patent No.: US 9,602,347 B2
(45) Date of Patent: Mar. 21, 2017

(54) METHOD, SYSTEM AND PROGRAM FOR BROWSER TO SWITCH IE KERNEL

(71) Applicant: BEIJING QIHOO TECHNOLOGY COMPANY LIMITED, Beijing (CN)

(72) Inventors: Zhi Chen, Beijing (CN); Xi Tang, Beijing (CN); Chenxi Zhao, Beijing (CN)

(73) Assignee: BEIJING QIHOO TECHNOLOGY COMPANY LIMITED, Beijing (CN)

( * ) Notice: Subject to any disclaimer, the term of this patent is extended or adjusted under 35 U.S.C. 154(b) by 247 days.

(21) Appl. No.: 14/348,551

(22) PCT Filed: Sep. 24, 2012

(86) PCT No.: PCT/CN2012/081856
§ 371 (c)(1),
(2) Date: Mar. 28, 2014

(87) PCT Pub. No.: WO2013/044775
PCT Pub. Date: Apr. 4, 2013

(65) Prior Publication Data
US 2014/0244812 A1 Aug. 28, 2014

(30) Foreign Application Priority Data
Sep. 28, 2011 (CN) .......................... 2011 1 0295749

(51) Int. Cl.
G06F 15/177 (2006.01)
H04L 12/24 (2006.01)
(Continued)

(52) U.S. Cl.
CPC ............ H04L 41/0816 (2013.01); G06F 8/67 (2013.01); G06F 9/44536 (2013.01);
(Continued)

(58) Field of Classification Search
CPC ................ H04L 67/02; H04L 41/0813; H04M 1/72561; G06F 9/44536; G06F 17/30861
See application file for complete search history.

(56) References Cited

U.S. PATENT DOCUMENTS

2012/0084345 A1* 4/2012 Silbey .................... H04L 67/02
709/203

FOREIGN PATENT DOCUMENTS

CN 101655863 A 2/2010
CN 102156709 A 8/2011
CN 102508710 A 6/2012

OTHER PUBLICATIONS

Oiaga, Marius, "IE9, IE8, IE7, IE6, and IE5 Compatibility Features", https://web.archive.org/web/20100625012747/http://news.softpedia.com/news/IE9-IE8-IE7-1E6-and-IE5-Compatibility-Features-145039.shtml, Published: Jun. 21, 2010, Accessed: Dec. 2, 2015.*

(Continued)

Primary Examiner — Nam Tran
(74) Attorney, Agent, or Firm — Baker & Hostetler LLP

(57) ABSTRACT

The present invention discloses a method, a system and a program for a browser to switch an IE Kernel which may be able to solve the problems of compatibility and adaptability of the browser kernel. The method comprises: generating a first IE kernel file and a second IE kernel file, and import them into a browser client; the browser process determining a currently adapted IE kernel version according to Uniform Resource Locator (URL) information submitted by a user; if the currently adapted IE kernel version is the first IE kernel, the browser process being redirected to a corresponding location to load the first IE kernel file; if the currently adapted IE kernel version is the second IE kernel, the
(Continued)

browser process being redirected to a corresponding location to load the second IE kernel file.

15 Claims, 13 Drawing Sheets

(51) Int. Cl.
  *G06F 9/445* (2006.01)
  *G06F 17/30* (2006.01)
  *H04L 29/08* (2006.01)
  *H04M 1/725* (2006.01)
(52) U.S. Cl.
  CPC .......... *G06F 17/30* (2013.01); *H04L 41/0813* (2013.01); *H04L 67/00* (2013.01); *H04L 67/02* (2013.01); *H04M 1/72561* (2013.01)

(56) References Cited

OTHER PUBLICATIONS

Crowley, Matthew, "Internet Explorer Architecture", Apress, http://link.springer.com/content/pdf/10.1007%2F978-1-4302-2854-7.pdf, pp. 1-37, 2010.*

Shen, Jun et al.; "Utilize Application Virtualization to Solve IE Compatibility Issue"; Computer Knowledge and Technology; Oct. 2010; vol. 6 No. 28; p. 8135-8137; English Abstract.

\* cited by examiner

IE kernel version determination module

IE6 kernel load module

METHOD, SYSTEM AND PROGRAM FOR BROWSER TO SWITCH IE KERNEL

CROSS-REFERENCE TO RELATED APPLICATIONS

This application is the National Stage of International Application No. PCT/CN2012/081856, filed Sep. 24, 2012, which claims the benefits of Chinese Patent Application No. 201110295749.X, filed Sep. 28, 2011, the disclosures of which are incorporated herein by reference in their entireties.

TECHNICAL FIELD

The present invention relates to a network technology, and in particular, to a method, a system and a program for a browser to switch an IE Kernel.

BACKGROUND ART

The most important part of a browser is a "Rendering Engine" which might mean "interpreting engine" and which is generally referred to as "browser kernel". The browser kernel is responsible for interpreting the syntax of the webpage (such as HTML and JavaScript) and rendering (displaying) a webpage. Therefore, the so called browser kernel usually is an engine which performs downloading, parsing, executing and rendering on the webpage. The engine determines that how the browser display the content of the webpage and the format information of a page.

Currently, browsers popular on the market can be roughly divided into two types according to the manners of implementation:

In the first type, the developer of the browser develops not only the development of the browser kernel but also the development of a product. Examples of this type of browser are as follows: the Chrome browser, the Firefox browser, the Safari browser, the Internet Explore browser, and so on.

In the second type, the developer of the browser only develops the product, using the kernel completed by other browser producer and embedding it into its own browser. Examples of this type of browser are as follows: the 360 security browser, the Maxthon browser, TheWorld Browser, the Sogou browser and so on. These browsers often employ the kernel of the Internet Explorer browser and may be commonly referred to as "a browser using an IE kernel".

At present, the browsers commonly using the IE kernel include a browser using an IE6 (Internet explorer 6) kernel and a browser using an IE8 (Internet Explorer 8) kernel. Specifically, Internet Explorer 6 was released on October 2001, which is more than 10 years from then on. Nevertheless, the browser using the IE6 kernel still occupies more than 50% of China's mainstream browser market share. However, due to the change in environment and long age, etc., the browser using the IE 6 kernel shows a relatively low performance in the environment where materials such as scripts, images, and flashes are greatly used in the present internet, so that the users fail to acquire a fluent experience. Internet explorer 8 has been extensively-used since its release in 2008, and the browser using the IE 8 kernel has been taking the place of the market share of the browser using the IE 6 kernel to become a mainstream web browser of the users. The system Windows Vista or higher even cancels the support of the version under IE8 directly. However, since the market of China's Internet is very complicated, obviously the users would face a lot of problems. A typical problem is that, since 2001, a large number of individuals and groups have built a plenty of websites and services that can only be normally operated on the browser using the IE 6 kernel, based on the loose standard of IE 6. In this case, the users cannot enjoy the technology of a new generation of browsers while achieving their demands for work and entertainment.

In conclusion, a technical problem urgently to be solved by the skilled in the art is how to solve the compatibility and adaptability between different IE kernels of the browser, in order for the users to acquire a better web browsing experience.

SUMMARY OF THE INVENTION

In view of the above problems, the present invention is proposed to provide a method, a system and a program for a browser to switch an IE Kernel so as to overcome the above problem or at least partially solve or relieve the above problems.

According to one aspect of the present invention, there is provided a method, comprising: generating a first IE kernel file and a second IE kernel file, and importing them into a browser client; determining by a browser process a currently adapted IE kernel version according to Uniform Resource Locator (URL) information submitted by a user; if the currently adapted IE kernel version is a first IE kernel, redirecting the browser process to a corresponding location to load the first IE kernel file; and if the currently adapted IE kernel version is a second IE kernel, redirecting the browser process to a corresponding location to load the second IE kernel file.

According to another aspect of the present invention, there is provided a system for a browser to switch an IE kernel, comprising: a kernel file generating module, configured to generate a first IE kernel file and a second IE kernel file, and import them into a browser client; an IE kernel version determination module, configured to determine a currently adapted IE kernel version according to Uniform Resource Locator (URL) information submitted by a user; a first kernel load module, configured to redirecting the browser process to a corresponding location to load the first IE kernel file if the currently adapted IE kernel version is a first IE kernel; and a second kernel load module, configured to redirecting the browser process to a corresponding location to load the second IE kernel file if the currently adapted IE kernel version is a second IE kernel.

According to another aspect of the present invention, there is provided a computer program, comprising: a computer readable code, when the computer readable code is operated on a terminal equipment, the terminal equipment executing above methods for a browser to switch an IE kernel.

According to another aspect of the present invention, there is provided a computer readable medium, in which the above computer program is stored.

The advantageous effects of the present invention are as follows:

First, the present invention, without influencing the use of the IE of a user, may load the IE6 kernel to the pages suitable for IE6 to display and load the IE8 kernel to the pages suitable for IE8 to display, so as to reach a most complete compatibility and adaptability for users' browsing under complex environment.

The present invention may fully combine the advantages of a general support on bank/major web portals of the IE6, and the advantages of enhanced security, rendering, and speed of the IE8, realizing a most complete compatibility mode between the IE6 kernel and the IE8 kernel. Furthermore, the present invention may provide an intelligent determination for automatically switching the kernel, thus there is no need to restart the browser, replace the operating system, upgrade IE or install a variety of software, so as to be easily used. In addition, the present invention has a good scalability and may support an automatic switch between different IE kernel versions.

The above description is merely an overview of the technical solution of the present invention. In order to understand the technical means of the present invention more clearly, implement the technical solution in accordance with the content of the specification and make above and other objects, features and advantages of the present invention more apparent, there are provided detailed embodiments of the present invention hereafter.

BRIEF DESCRIPTION OF THE DRAWINGS

Other advantages and benefits will become clear to the skilled in the art by reading the following detailed description of the preferred embodiment. The accompanying drawings are only for the purpose of illustrating the preferred embodiment, should not be constructed as limiting the present invention.

Moreover, the same components will indicated by the same reference throughout the drawings, in which:

FIG. 1-A schematically illustrates a flowchart of the sub-steps included in step 101 of FIG. 1;

FIG. 1-B schematically illustrates a flowchart of the sub-steps included in step S01 of FIG. 1-A;

FIG. 1-C schematically illustrates another flowchart of the sub-steps included in step S01 of FIG. 1-A;

FIG. 1-D schematically illustrates a flowchart of sub-steps included in step 102 of FIG. 1;

FIG. 1-E schematically illustrates a flowchart of sub-steps included in step of redirecting the browser process to a corresponding location of the client to load the IE6 kernel file;

FIG. 1-F schematically illustrates a flowchart of sub-steps included in step of redirecting the browser process to the corresponding location of the client to load the IE8 kernel file;

FIG. 3-A schematically illustrates a block diagram of the sub-module included in a kernel file generation module 301 in FIG. 3;

FIG. 3-B schematically illustrates a block diagram of the sub-module included in a DLL extraction sub-module 3011 in FIG. 3-A;

FIG. 3-C schematically illustrates a block diagram of the sub-module included in an IE kernel version determination module 302 in FIG. 3;

FIG. 3-D schematically illustrates a block diagram of the sub-module included in an IE6 kernel load module 303 in FIG. 3;

FIG. 3-E schematically illustrating a block diagram of the sub-module included in an IE8 kernel load module 304 in FIG. 3;

DETAILED DESCRIPTION OF THE EMBODIMENTS

The present invention will be further described below in conjunction with the accompanying drawings and the detailed description of the embodiments.

In the embodiments of the present invention, a first IE kernel file and a second IE kernel file are generated and pre-imported into a browser client; a currently adapted IE kernel version is determined in a browser process according to Uniform Resource Locator (URL) information submitted by a user; if the currently adapted IE kernel version is a first IE kernel, the browser process is redirected to a corresponding location to load the first IE kernel file; and if the currently adapted IE kernel version is a second IE kernel, the browser process is redirected to a corresponding location to load the second IE kernel file. Thus an adaptable switch of an IE kernel in the browser may be implemented. For the convenience of description, in the following method and system embodiments of the present invention, the first IE kernel uses the IE6 kernel to explain and name the module in the system embodiments, and the second IE kernel uses an IE kernel having IE8 or higher version to reveal the technical solution of the present invention and name the module in the system embodiments. It should be understood by the skilled in the art that the above first IE kernel is not limited to the IE6 kernel, and the second IE kernel is not limited to the IE kernel having IE8 or higher version; the protection scope of the present invention is intended to cover a mutual switch circumstance between any two of different IE versions of the browser.

Figure 1:
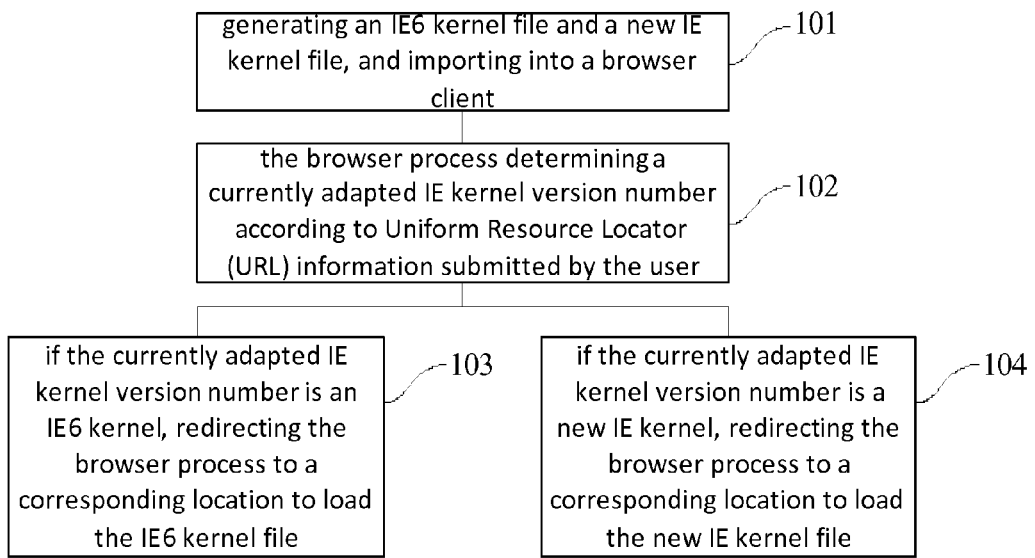
FIG. 1 schematically illustrates a flowchart of a switch method between an IE6 kernel and a new IE kernel according to a first embodiment of present invention.
Figure 1A:
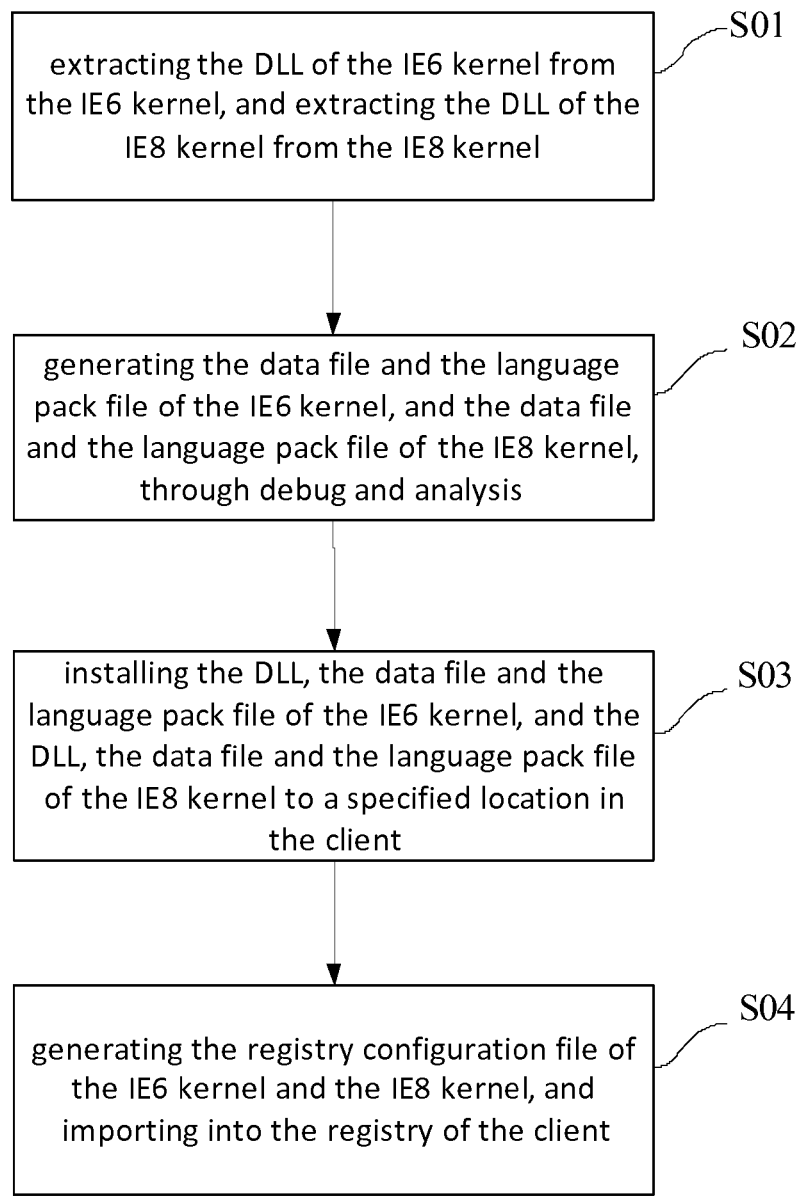
Figure 1B:
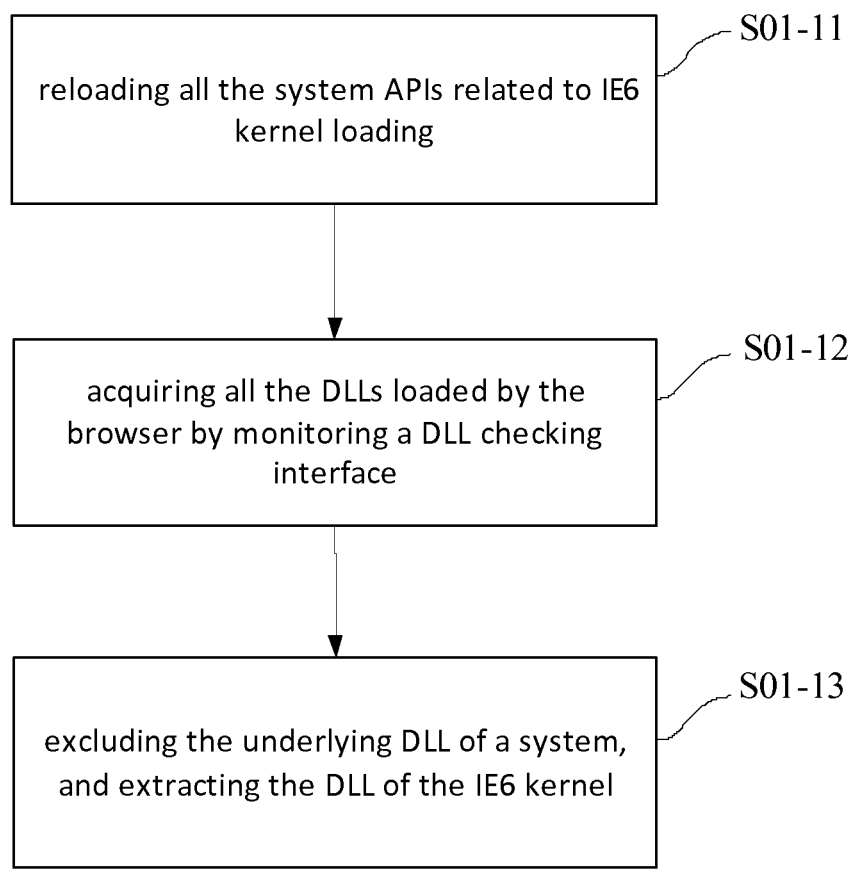
Figure 1C:
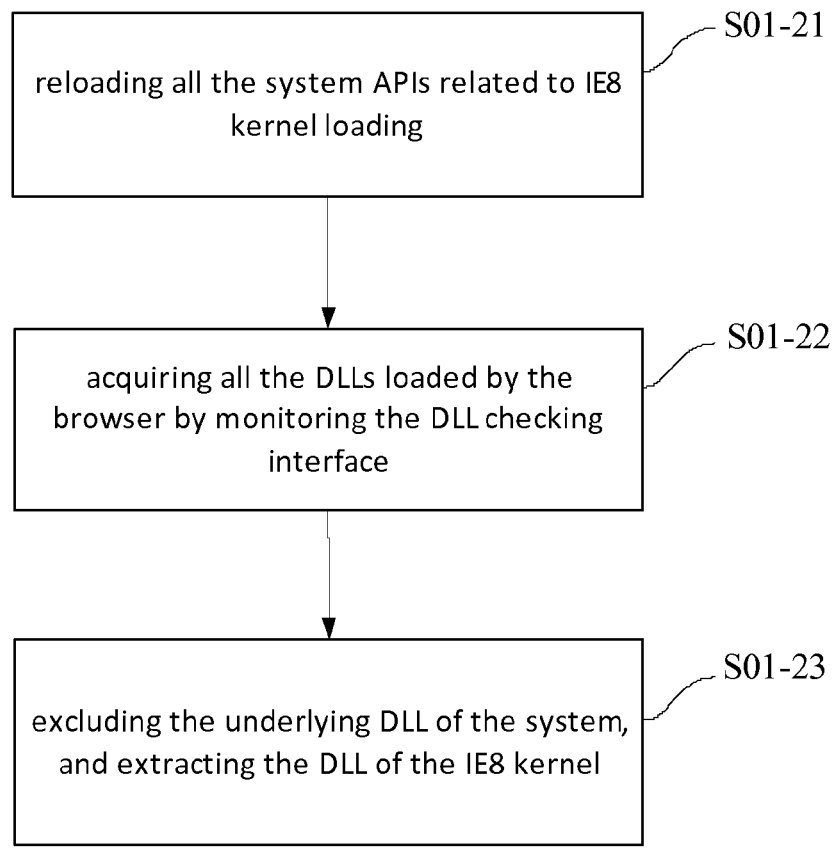
Figure 1D:
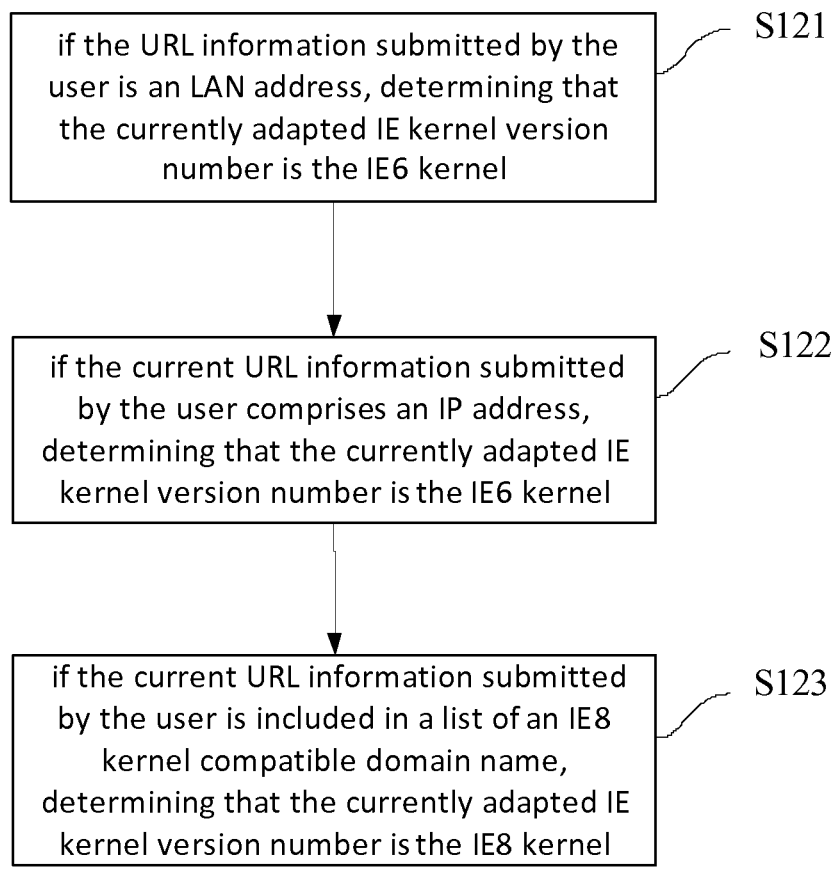
Figure 1E:
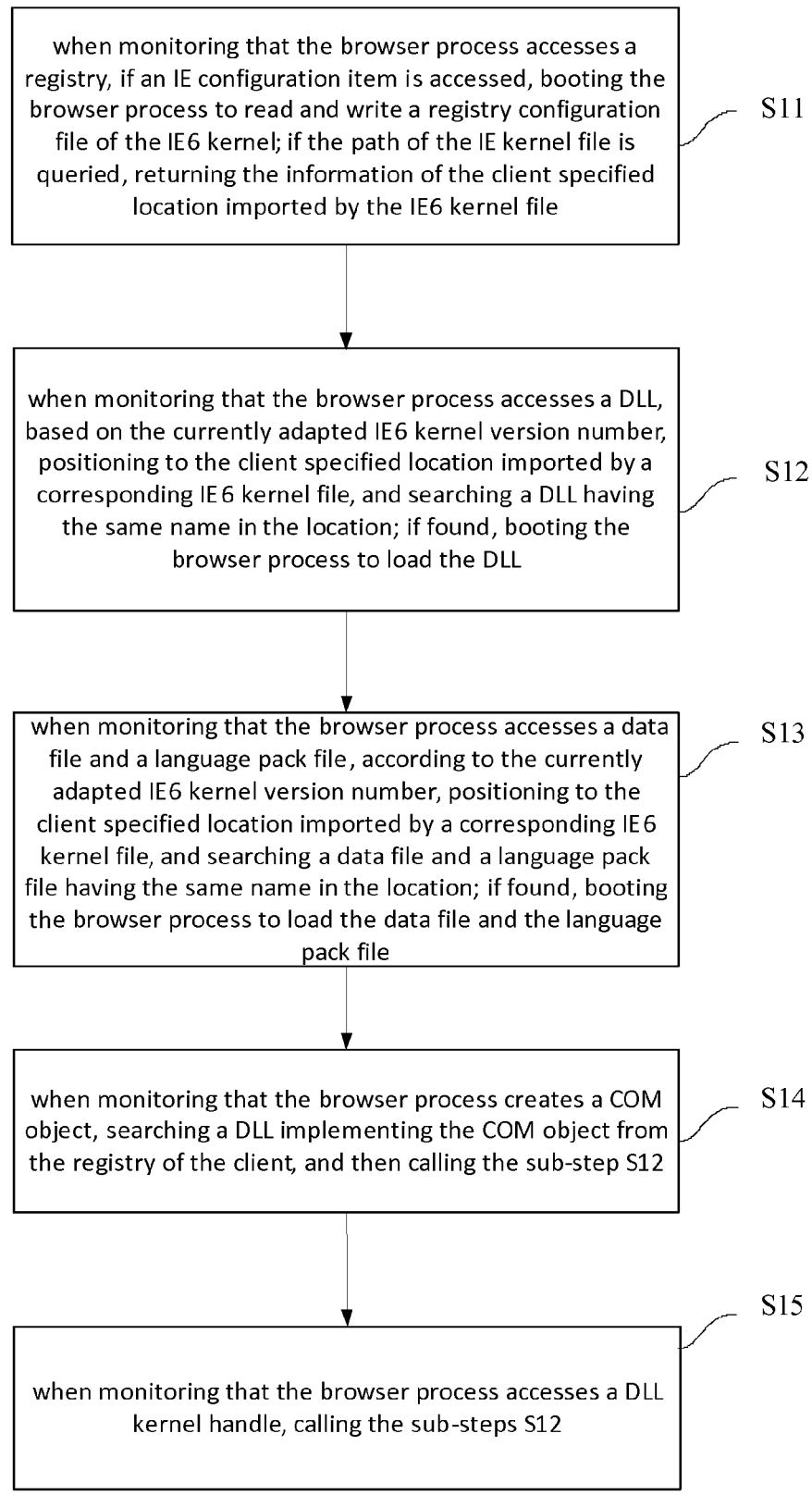
Figure 1F:
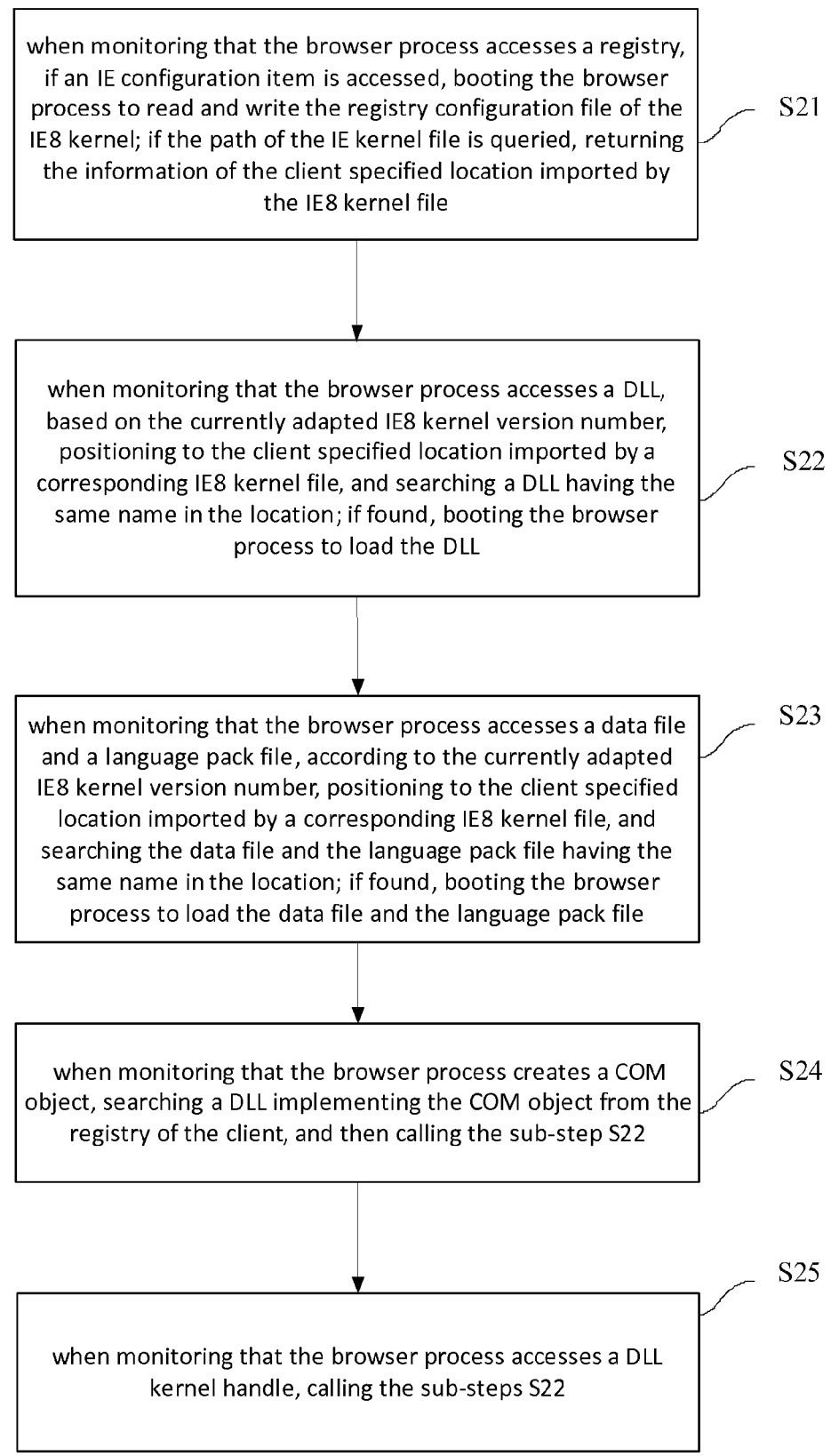

In the embodiments of the present invention, without influencing the use of the IE of the user, the IE6 kernel is loaded to pages suitable for the IE6 to display, and the IE8 kernel is loaded to pages suitable for IE kernel having IE8 or higher version to display, so as to reach a most complete compatibility and adaptability for users' browsing under a complex environment. In the following embodiments of the present invention, for the convenience of description, IE8 is used as an example to describe IE kernel having IE8 or higher version. Therefore, it should be understood by the skilled in the art that, in the following embodiments of the present invention, the description of the technical solution of IE8 may be also applicable to IE kernel having the version higher than IE8. Referring to FIG. 1, it shows a flowchart of a switch method between an IE6 kernel and new IE kernel according to a first embodiment of the present invention. Specifically the method may comprise the following steps:

Step 101, generating an IE6 kernel file and a new IE kernel file, and import them into a browser client;

In the embodiment of the present invention, the IE kernel refers to a browser kernel employing the IE (Internet Explorer), the IE6 kernel refers to a browser kernel employing IE6 (Internet Explorer 6), the new IE kernel includes an IE8 kernel or an IE kernel higher than IE8, the IE8 kernel refers to a browser kernel employing IE8 (Internet Explorer 8), and the IE kernel higher than IE8 refers to a browser kernel employing IE9, IE10 or possibly higher versions. The browser client is a browser software that runs at least based on the IE kernel therein.

In order for the skilled person in the art to better understand the present invention, the IE8 kernel is described as an example of the new IE kernel in the specification.

In a preferred embodiment of the present invention, the new IE kernel file may be the IE8 kernel file, and the IE6 kernel file and the IE8 kernel files may include: the dynamic link library (DLL) of the IE6 kernel and the dynamic link library (DLL) of the IE8 kernel;
the data file of the IE6 kernel and the data file of the IE8 kernel;
the language pack file of the IE6 kernel and the language pack file of the IE8 kernel; and
the registry configuration file of the IE6 kernel and the registry configuration file of the IE8 kernel.

Herein, DLL is the short form of Dynamic Link Library, which is a library of codes and data which can be used by multiple programs at the same time and which is an unexecutable file. The dynamic link provides a way to make a process call a function that does not belong to its executable codes. The executable codes of the function are located in a DLL. The DLL comprises one or more functions that have been compiled, linked, and are separately stored from processes using them. The DLL also helps to share data and resources. A plurality of applications can access the content of a single DLL copy in a memory simultaneously. By using the DLL, the program can be modularized and consist of relatively independent components.

In the present embodiment, the step 101 may include the following sub-steps, specifically referring to FIG. 1-A, which schematically shows a flowchart of sub-steps included in step 101 in FIG. 1:
Sub-step S01, extracting the dynamic link library (DLL) of the IE6 kernel from the IE6 kernel, and extracting the dynamic link library (DLL) of the IE8 kernel from IE8 kernel;
Sub-step S02, generating the data file and the language pack file of the IE6 kernel, and the data file and the language pack file of the IE8 kernel, through debug and analysis;
Sub-step S03, installing the DLL, the data file and the language pack file of the IE6 kernel, and the DLL, the data file and the language pack file of the IE8 kernel to a specified location in the client;
For example, the DLL, the data file and the language pack file of the IE6 kernel and the DLL, the data file and the language pack file of the IE8 kernel are installed to a certain directory of the client.

In the specific practice, the above related files of the IE6 kernel as well as the related files of the IE8 kernel may be stored in different directories of the client, respectively; or, they may be stored in the same directory with version number identification marked for each file, respectively (which is not restricted in the present invention).

Sub-step S04, generating the registry configuration files of the IE6 kernel and the IE8 kernel, and importing them into the registry of the client.

In the IE kernel based browser, a plurality of kernel DLLs are loaded statically and dynamically. These DLLs may be associated with the underlying of an operating system, may be required to quote some registry entries, data files or the language pack files, and may be generated through debugging and gradual analysis.

More preferably, the sub-step S01 may include the following sub-steps, specifically referring to FIG. 1-B, which schematically illustrates a flowchart of sub-steps included in step S01 of FIG. 1-A:
Sub-step S01-11, reloading all the system application program interfaces (API) related to IE6 kernel loading;
Sub-step S01-12, acquiring all the DLLs loaded by the browser by monitoring an DLL checking interface;
For example, all the DLLs loaded by the browser are acquired by monitoring the Load Library interface (or other module viewer).
Sub-step S01-13, excluding the underlying DLL of the system, and extracting the DLL of the IE6 kernel.
For details, please refer to FIG. 1-C, showing another flowchart of sub-steps included in step S01 of FIG. 1-A:
Sub-step S01-21, reloading all the system application program interfaces (APIs) related to the IE8 kernel;
Sub-step S01-22, acquiring all the DLLs loaded by the browser by monitoring an DLL checking interface;
Sub-step S01-23, excluding the underlying DLL of the system, and extracting the DLL of the IE8 kernel.

Step 102, the browser process determining a currently adapted IE kernel version number according to Uniform Resource Locator (URL) information submitted by a user;

The URL (Uniform Resource Locator), which is the address of a WWW webpage, determines an address using numbers and letters in a certain order. The first part http:// of URL indicates the type of a file to be accessed. The http is always used on the Internet (which means hypertext transfer protocol, since it is used to convert the protocols of the webpage).

The URL is composed by the following parts from left to right:
Internet resource type (scheme): it indicates a tool operated by a WWW client program. For example, "http://" indicates a WWW server, "ftp://" indicates an FTP server, "gopher://" indicates a Gopher server, and "new:" indicates a Newgroup newsgroups.
Server address (host): it indicates the domain name of the server where a WWW webpage is located.
Port (port): sometimes (not always), a corresponding server port number is needed to provide for an access to some resources.
Path (path): it indicates the locations of some resource on the server (format thereof is the same as that in a DOS system, which usually consists of directory/sub-directory/file name). Like the port, the path is not always necessary.
URL address format is: scheme://host:port/path, http://www.maogoo.com/bbs is a typical URL address, for example. The browser first checks HTTP (hypertext transfer protocol), and then knows it is an HTML link to be handled. The following www.maogoo.com is a website address, and the last is directory /BBS.

As it is well known, a process is a program being executed, which is program routine operating in a computer; the process may be assigned to a processor and executed by the processor as an entity. From the view of a user, the browser process can be understood as a process on behalf of the browser started in the Task Manager.

In a preferred embodiment of the present invention, the step 102 may specifically include the following sub-steps. For detail refer to FIG. 1-D, which is a flowchart illustrating sub-steps included in step 102 of FIG. 1:
Sub-step S121, if the current Uniform Resource Locator (URL) information submitted by the user is an LAN address, determining that the currently adapted IE kernel version number is the IE6 kernel;

Sub-step S122, if the current Uniform Resource Locator (URL) information submitted by the user comprises an IP address, determining that the currently adapted IE kernel version number is the IE6 kernel;

Sub-step S123, if the current Uniform Resource Locator (URL) information submitted by the user is included in a list of an IE8 kernel compatible domain name, determining that the currently adapted IE kernel version number is the IE8 kernel.

That is, before each page starts linking, the browser process determines the information of an accessed domain name, if it is the LAN address or an HTTP request of a simple IP Address, an IE6 mode is opened; according to the list of the IE8 kernel compatible domain name in practice, determine that an IE8 mode is opened. In the specific implementation, for other cases, other IE kernel built in the system can be used.

In practice, if the new IE kernel is an IE kernel with version higher than IE8, the step 102 may also include the following sub-steps:

If the current Uniform Resource Locator (URL) information submitted by the user is included in the list of a new kernel compatible domain name, determining that the currently adapted kernel version number is the new IE kernel.

Step 103, if the currently adapted IE kernel version is the IE6 kernel, redirecting the browser process to a corresponding location to load the IE6 kernel file;

Redirection literally is directly transferring the operation on file A to file B. For example, operations may be reading, writing, setting the properties such as the length or end pointer of a file, or even deleting.

In a preferred embodiment of the present invention, the step of redirecting the browser process to a corresponding location of the client to load the IE6 kernel file may include the following sub-steps. Specifically see FIG. 1-E, which illustrates a flowchart of sub-steps included in the step of redirecting the browser process to a corresponding location of the client to load the IE6 kernel file:

Sub-step S11, when monitoring that the browser process accesses a registry, if an IE configuration item is accessed, booting the browser process to read and write the registry configuration file of the IE6 kernel; if the path of the IE kernel file is queried, returning the information of the client specified location imported by the IE6 kernel file;

Sub-step S12, when monitoring that the browser process accesses a DLL, based on the currently adapted IE6 kernel version number, positioning to the client specified location imported by the corresponding IE6 kernel file, and searching the DLL having the same name in the location; if found, booting the browser process to load the DLL;

Sub-step S13, when monitoring that the browser process accesses a data file and a language pack file, according to the currently adapted IE6 kernel version number, positioning to the client specified location imported by the corresponding IE6 kernel file, and searching the data file and the language pack file having the same name in the location; if found, booting the browser process to load the data file and language pack file;

Step S14, when monitoring that the browser process creates a COM object, searching a DLL implementing the COM object from the registry of the client, and then calling the sub-step S12;

Herein, the COM object (The Component Object Model) is an executable binary code which is composed by a COM standard and released in the form of Win32 dynamic-link library (DLL) or executable file (EXE), and is able to comply with all the demands of the component architecture.

Due to the COM-compliant standard, inter-operation can be provided between component and application and between components so as to extremely easily create a scalable application system. The COM object is a reusable software component using a COM specification. The use of the COM specification may ensure that the COM object works well and may be easily incorporated into your application. In fact, the COM basically corresponds to a black box, which is able to do a lot of work for your application. The COM object is generally implemented by the dynamic link library (DLL). Like a common DLL, the COM object provides some methods and the application can call it to complete any supported operations.

Sub-step S15, when monitoring that the browser process accesses a DLL kernel handle, calling the sub-steps S12.

Herein, a handle is used for the Windows to mark a unique integer used or created in the application, and the Windows uses a lot of handles to mark many objects. However, the handle is not a pointer, thus the program cannot use the handle to directly read information in a file.

Step 104, if the currently adapted IE kernel version number is a new IE kernel, redirecting the browser process to a corresponding location to load the new IE kernel file.

In a preferred embodiment of the present invention, the step of redirecting the browser process to a corresponding location of the client to load the IE8 kernel file may include the following sub-steps. Specifically see FIG. 1-F, which shows a flowchart of sub-steps included in the step of redirecting the browser process to a corresponding location of the client to load the IE8 kernel file:

Sub-step S21, when monitoring that the browser process accesses a registry, if an IE configuration item is accessed, booting the browser process to read and write the registry configuration file of the IE8 kernel; if the path of IE kernel file is queried, returning the information of the client specified location imported by the IE8 kernel file;

Sub-step S22, when monitoring that the browser process accesses a DLL, based on the currently adapted IE8 kernel version number, positioning to the client specified location imported by the corresponding IE8 kernel file, and searching the DLL having the same name in the location; if found, booting the browser process to load the DLL;

Step S23, when monitoring that the browser process accesses a data file and a language pack file, according to the currently adapted IE8 kernel version number, positioning to the client specified location imported by the corresponding IE8 kernel file, and searching the data file and the language pack file having the same name in the location; if found, booting the browser process to load the data file and language pack file;

Sub-step S24, when monitoring that the browser process creates a COM object, searching a DLL implementing the COM object from the registry of the client, and then calling the sub-step S22;

Sub-step S25, when monitoring that the browser process accesses a DLL kernel handle, calling the sub-steps S32.

Specifically, in the embodiment of the invention, the redirection of the IE kernel file refers to, when the browser is created, turning to a program specified path to load a file, which mainly including:

1. IE kernel redirection. Allow a browser to load a specified version kernel object to reload and implement the system API, specifically employing:

CoCreateInstance: create a document and a framework component

CoGetClassObject: create a script engine and a script object

CoCreateInstanceEx: create a expansion interface such as a word system

2. DLL redirection. Some functional modules may be implemented in a form of DLL, thus it is also necessary to reload the system API to redirect, specifically employing:
LoadLibrary/LoadLibrary: load DLL
FreeLibrary: release DLL
3. registry redirection. Allow a browser to load/save a specified version configuration data to reload and implement the system API, specifically employing:
RegOpenKeyEx: Open a registry key to read and write As a matter of course, above method is only used as an example. In specific implementations, it should be feasible for those skilled in art to use other kernel redirection method to load the corresponding version of the IE kernel file, which it is not necessary to be limited for present invention.

Figure 2:
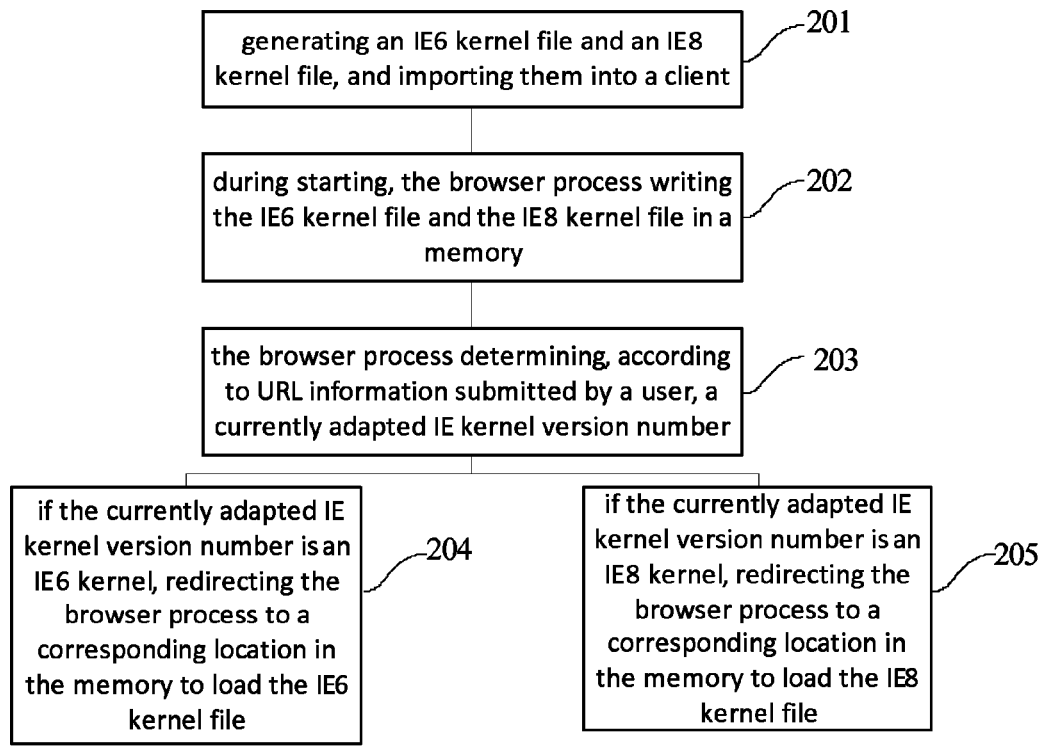
FIG. 2 schematically illustrates a flowchart of a switch method between an IE6 kernel and a new IE kernel according to a second embodiment of present invention.

Referring to FIG. 2, it shows a flowchart of a switch method between an IE6 kernel and a new IE kernel according to a second embodiment of the present invention, and the method specifically may include the following steps:

Step 201, generating an IE6 kernel file and an IE8 kernel file, and import them into a client;

Step 202, when starting, the browser process writing the IE6 kernel file and the IE8 kernel file in a memory;

Step 203, the browser process determining, according to Uniform Resource Locator (URL) information submitted by a user, a currently adapted IE kernel version number;

Step 204, if the currently adapted IE kernel version number is an IE6 kernel, redirecting the browser process to a corresponding location in the memory to load the IE6 kernel file;

Step 205, if the currently adapted IE kernel version number is an IE8 kernel, redirecting the browser process to a corresponding location in the memory to load the IE8 kernel file.

In order for those skilled in art to better understand the present invention, a complete example illustrating the switch process between the IE6 kernel and the IE8 kernel according to the present invention will be provided hereafter.

Step A, installing the main module file of the IE6 kernel and the main module file of the IE8 kernel to a specified directory of the client;

Herein, the main module file of the IE6 kernel and the main module file of the IE8 kernel include: the dynamic link library DLL of the IE6 kernel and the dynamic link library of the IE8 kernel; the data file of the IE6 kernel and the data file of the IE8 kernel; the language pack file of the IE6 kernel and the language pack file of the IE8 kernel.

Step B, importing the registry configuration file of the IE6 kernel and the registry configuration file of the IE8 kernel to a registry of the client;

Step C, when starting, the browser performing the following sub-steps:

Sub-step C1, monitoring the access of the registry, the DLL, the memory, and the web page (URL input or clicked by the user);

Sub-step C2, loading the main module file of the IE6 kernel and the main module file of the IE8 kernel into the memory;

Step D, when the browser receives the URL submitted by the user, IE kernel version number suitable for the URL being calculated as follows:

If the URL is an LAN address, returning the IE kernel version number of IE6 (using the IE6 kernel);

If the URL comprises an IP address, returning the IE kernel version number of IE6 (using the IE6 kernel);

If the URL is included in the list of a IE8 compatible domain name, returning the IE kernel version number of IE8 (using the IE8 kernel); and In other cases, returning 0 (using an IE kernel built in the system).

Step E, when the browser starting to load a kernel and create a webpage, it may read and write the registry, load the DLL and the data file, and create the COM object, specifically comprising the following operations:

1. when monitoring that the browser accesses the registry, if an IE configuration item is accessed, booting the browser to read and write the corresponding entry imported at the step B; if the path of IE kernel module is queried, returning the memory specified location at step C;

2. when monitoring that the browser accesses the DLL, according to the IE kernel version number calculated at step D, positioning to a corresponding kernel directory in the memory and searching the DLLs having the same name therein, if found, booting the browser process to load the corresponding kernel file; otherwise, booting the browser to load a default module of the system;

3. when monitoring that the browser process accesses data file and the language pack file, according to the IE kernel version number calculated at step D, searching the file corresponding to kernel file directory in the memory;

4. when monitoring that the browser creates a COM object, searching a DLL implementing the COM object from the registry at step B, and executing the above step 2;

5. when monitoring that the browser accesses a DLL kernel handle, executing the above step 2.

In this case, the steps A and B can be completed during the installation, the step C is executed every time the browser process is started, and the steps D and E are executed every time a webpage is browsed.

It should be explained that, for the purpose of a simple description, the method embodiments have been described as combinations of a series of actions, but the skilled person in the art should be aware that the present invention is not limited by the sequence of actions as described. According to the present invention, some of the steps can be performed in other sequences or simultaneously. Secondly, the skilled person in the art should be aware that each embodiments described in the specification are the preferred embodiments, and related actions and modules may not be necessarily required in the present invention.

Figure 3:
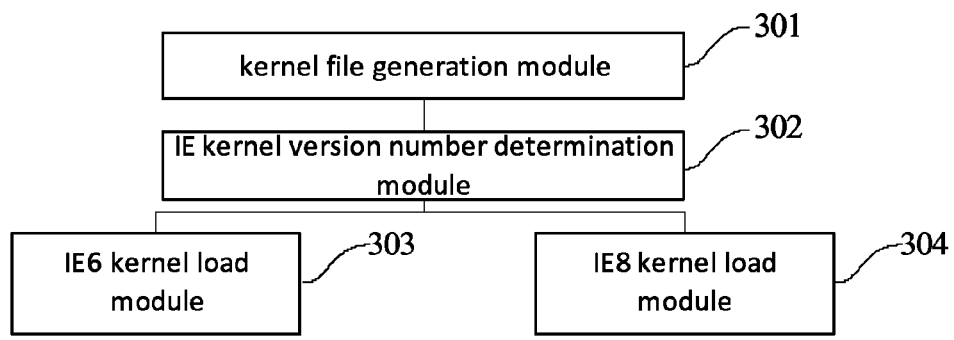
FIG. 3 schematically illustrates a block diagram of a switch system between an IE6 kernel and a new IE kernel according to an embodiment of the present invention.
Figure 3A:
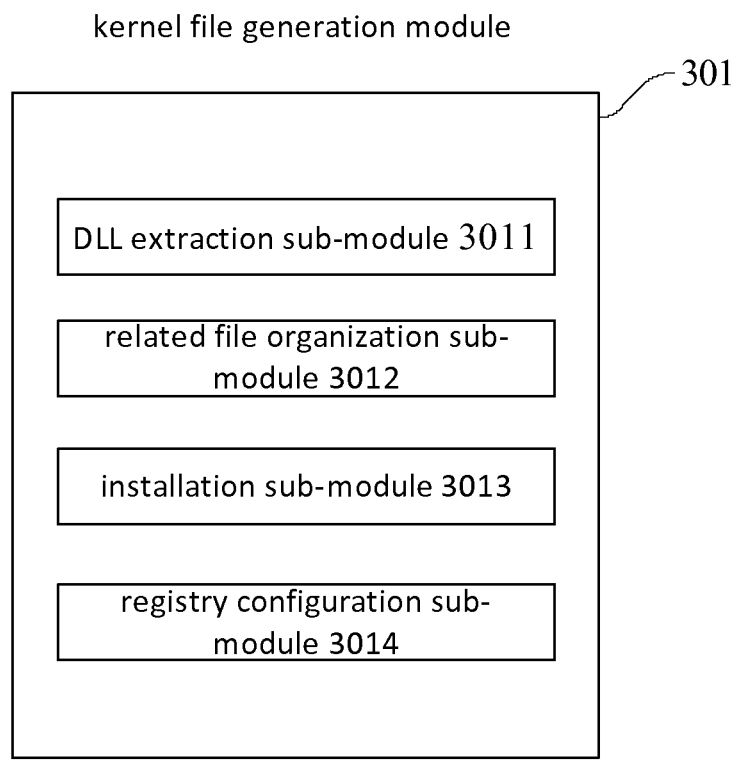
Figure 3B:
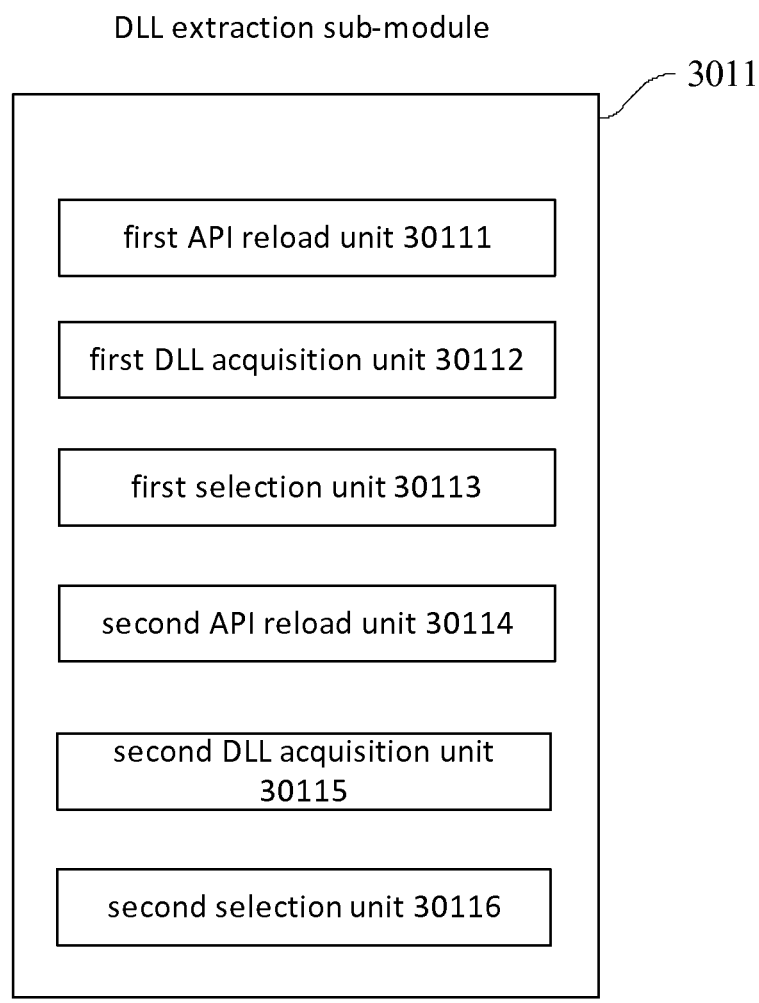
Figure 3C:
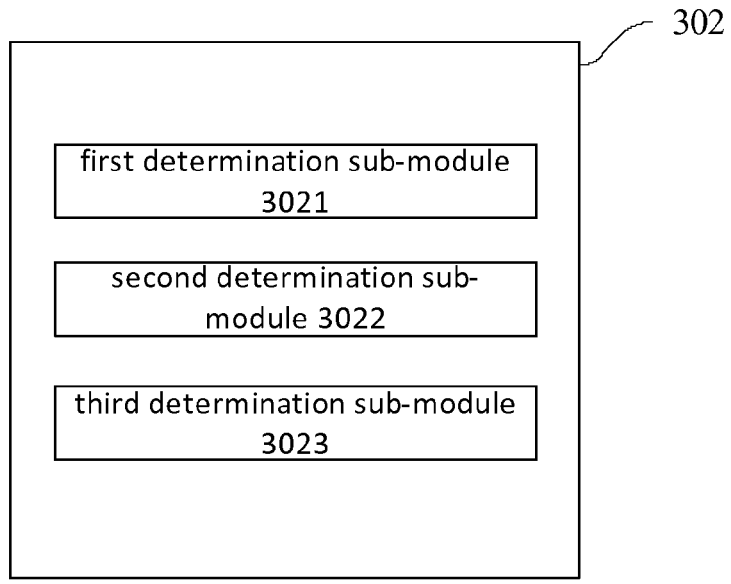
Figure 3D:
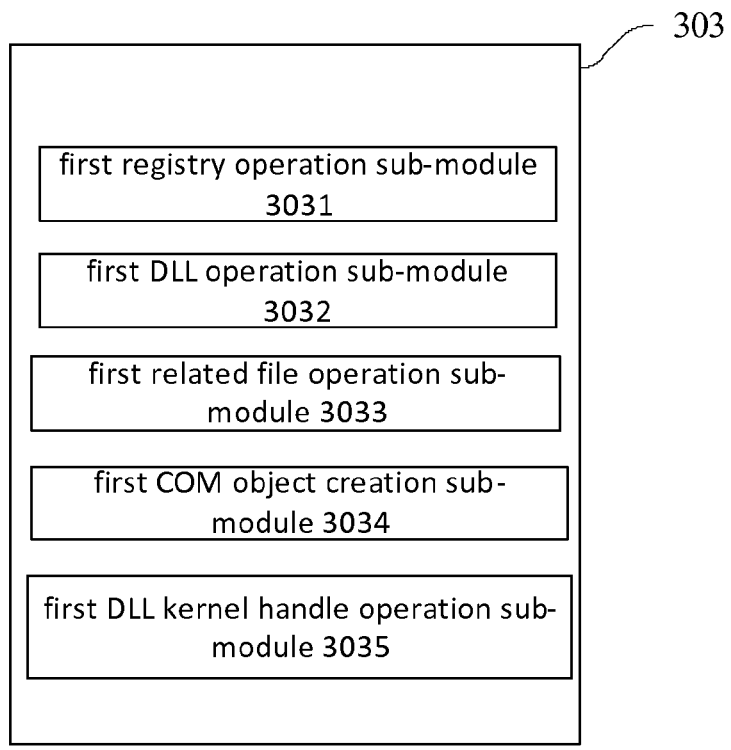
Figure 3E:
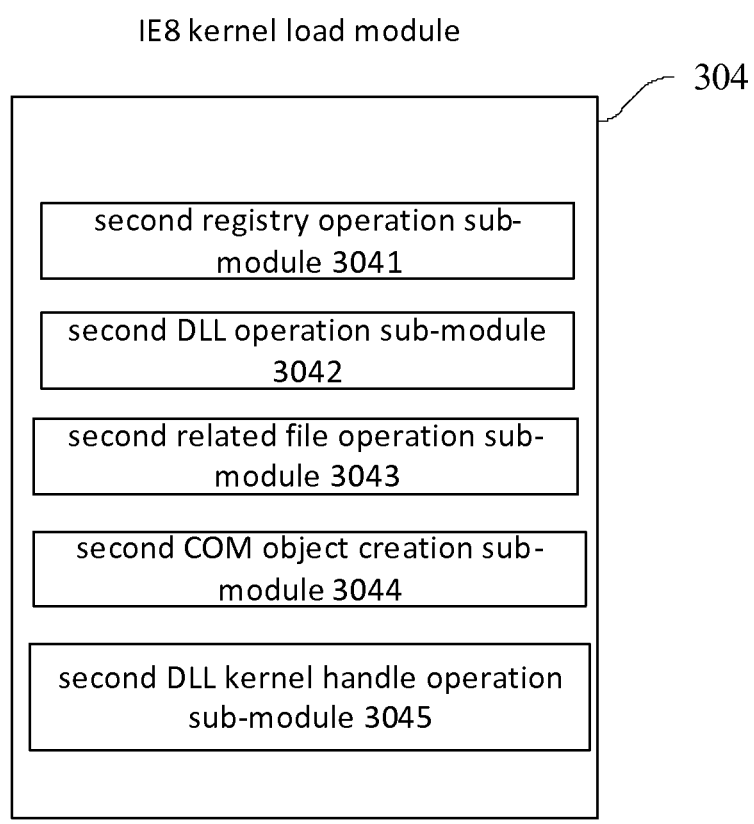

Referring to FIG. 3, it shows a block diagram of a switch system between an IE6 kernel and a new kernel according to the embodiment of the present invention, and the system specifically may include the following modules:

a kernel file generation module 301, configured to generate an IE6 kernel file and a new IE kernel file, and import them into a client;

an IE kernel version determination module 302, configured to determine a currently adapted IE kernel version number by the browser process according to Uniform Resource Locator (URL) information submitted by a user;

an IE6 kernel load module 303, configured to redirect the browser process to a corresponding location to load the IE6 kernel file when the currently adapted IE kernel version is an IE6 kernel;

an IE8 kernel load module 304, configured to redirect the browser process to a corresponding location to load the new IE kernel file when the currently adapted IE kernel version is a new IE kernel.

In the embodiment of the present invention, the new IE kernel may be an IE8 kernel. In order for the skilled person in the art to better understand the present invention, the IE8 kernel is described as an example of the new IE kernel in the specification.

In practice, the new IE kernel can also be an IE kernel having a higher version than IE8; in this case, the new the IE kernel file may be an IE kernel file having a higher version than IE8.

In a preferred embodiment of the present invention, the new IE kernel file may be an IE8 kernel file, and the IE6 kernel file and the IE8 kernel file may include: the dynamic link library (DLL) of the IE6 kernel and the dynamic link library (DLL) of the IE8 kernel;
the data file of the IE6 kernel and the data file of the IE8 kernel;
the language pack file of the IE6 kernel and the language pack file of the IE8 kernel; and
the registry configuration file of the IE6 kernel and the registry configuration file of the IE8 kernel.

In this case, the kernel file generation module 301 may include the following sub-modules. Specifically, referring to FIG. 3-A, it shows a block diagram of sub-modules included in the kernel file generation module 301 of FIG. 3.
an DLL extraction sub-module 3011, configured to extract the dynamic link library (DLL) of the IE6 kernel from IE6 kernel, and extract the dynamic link library (DLL) of the IE8 kernel from IE8 kernel;
a related file organization sub-module 3012, configured to generate a data file and a language pack file of the IE6 kernel, and a data file and a language pack file of the IE8 kernel, through debug and analysis;
an installation sub-module 3013, configured to install the DLL, the data file and the language pack file of the IE6 kernel, and the DLL, the data file and the language pack file of the IE8 kernel to a specified location in the client;
a registry configuration sub-module 3014, configured to generate the registry configuration files of the IE6 kernel and the IE8 kernel, and import them into the registry of the client.

In a preferred embodiment of the present invention, the DLL extraction sub-module 3011 may include the following sub-modules. Specifically referring to FIG. 3-B, it illustrates a block diagram of sub-modules included in the DLL extraction sub-module 3011 of FIG. 3-A:
a first API reload unit 30111, configured to reload the system application program interface (API) related to IE6 kernel loading;
a first DLL acquisition unit 30112, configured to acquire all the DLLs loaded by the browser by monitoring a DLL checking interface;
a first selection unit 30113, configured to exclude the underlying DLL of the system, and extract the DLL of the IE6 kernel; and
a second API reload unit 30114, configured to reload the system application program interface (API) related to IE8 kernel loading;
a second DLL acquisition unit 30115, configured to acquire all the DLLs loaded by the browser by monitoring a DLL checking interf;
a second selection unit 30116, configured to exclude the underlying DLL of the system, and extract the DLL of the IE8 kernel.

As an applicable example according to the embodiment of the present invention, the IE kernel version determination module 302 may include the following sub-modules. Specifically referring to FIG. 3-C, it shows a block diagram of sub-modules included in the IE kernel version determination module 302 of FIG. 3:

a first determination sub-module 3021, configured to determine that the currently adapted IE kernel version number is an IE6 kernel when the current Uniform Resource Locator (URL) information submitted by the user is an LAN address;
a second determination sub-module 3022, configured to determine that the currently adapted IE kernel version number is the IE6 kernel when the current Uniform Resource Locator (URL) information submitted by the user comprises an IP address;
a third determination sub-module 3023, configured to determine that the currently adapted IE kernel version number is an IE8 kernel when the current Uniform Resource Locator (URL) information submitted by the user is included in a list of an IE8 kernel compatible domain name.

In a specific implementation, the IE6 kernel load module 303 may include the following sub-modules. Specifically referring to FIG. 3-D, it shows a block diagram of sub-modules included in the IE6 kernel load module 303 of FIG. 3:
a first registry operation sub-module 3031, configured to, when monitoring that the browser process accesses a registry, if an IE configuration items is accessed, boot the browser process to read and write the registry configuration file of the IE6 kernel; if the path of an IE kernel file is queried, return the information of the client specified location imported by the IE6 kernel file;
a first DLL operation sub-module 3032, configured to, when monitoring that the browser process accesses a DLL, based on the currently adapted IE6 kernel version number, position to the client specified location imported by a corresponding IE6 kernel file and search a DLL having the same name therein; if found, boot the browser process to load the DLL;
a first related file operation sub-module 3033, configured to, when monitoring that the browser process accesses a data file and a language pack file, according to the currently adapted IE6 kernel version number, position to the client specified location imported by a corresponding IE6 kernel file and search the data file and language pack file having the same name therein; if found, boot the browser process to load the data file and language pack file;
a first COM object creation sub-module 3034, configured to, when monitoring that the browser process creates a COM object, search a DLL implementing the COM object from the registry of the client, and then call the first DLL operation sub-module 3032;
a first DLL kernel handle operation sub-module 3035, configured to, when monitoring that the browser process accesses a DLL kernel handle, call the first DLL operation sub-module 3032.

In specific implementation, the IE8 kernel load module 304 may include the following sub-modules. Specifically referring to FIG. 3-E, it illustrates a block diagram of sub-modules included in the IE8 kernel load module 304 of FIG. 3:
a second registry operation sub-module 3041, configured to, when monitoring that the browser process accesses a registry, if an IE configuration item is accessed, boot the browser process to read and write the registry configuration file of the IE8 kernel; if the path of an IE kernel file is queried, return the information of the client specified location imported by the IE8 kernel file;
a second DLL operation sub-module 3042, configured to, when monitoring that the browser process accesses a DLL, based on the currently adapted IE8 kernel version number, position to the client specified location imported by a corresponding IE8 kernel file and search a DLL having the same name therein; if found, boot the browser process to load the DLL;

a second related file operation sub-module 3043, configured to, when monitoring that the browser process accesses a data file and a language pack file, according to the currently adapted IE8 kernel version number, position to the client specified location imported by a corresponding IE8 kernel file and search the data file and the language pack file having the same name therein; if found, boot the browser process to load the data file and the language pack file;

a second COM object creation sub-module 3044, configured to, when monitoring that the browser process creates a COM object, search a DLL implementing the COM object from the registry of the client, and call the second DLL operation sub-module 3042;

a second DLL kernel handle operation sub-module 3045, configured to, when monitoring that the browser process accesses a DLL kernel handle, call the second DLL operation sub-module 3042.

In a preferred embodiment of the present invention, the system may also comprise:

a memory write-in module, configured to write the IE6 kernel file and the IE8 kernel file in the memory.

In this case, the corresponding location to which the browser process is redirected is the corresponding location in the memory.

Since the above system embodiment is substantially similar to the method embodiments, the description thereof is relatively brief. As for the related parts, reference may be made to the corresponding description of the method embodiments.

Each of members according to the embodiments of the present invention can be implemented by hardware, or implemented by software modules operating on one or more processors, or implemented by the combination thereof. A person skilled in the art should understand that, in practice, a microprocessor or a digital signal processor (DSP) may be used to realize some or all of the functions of some or all of the members of the browser device according to the embodiments of the present invention. The present invention may further be implemented as equipments or device programs (for example, computer programs and computer program products) for executing some or all of the methods as described herein. The programs for implementing the present invention may be stored in the computer readable medium, or have a form of one or more signal. Such a signal may be downloaded from the internet websites, or be provided in carrier, or be provided in other manners.

Figure 4:
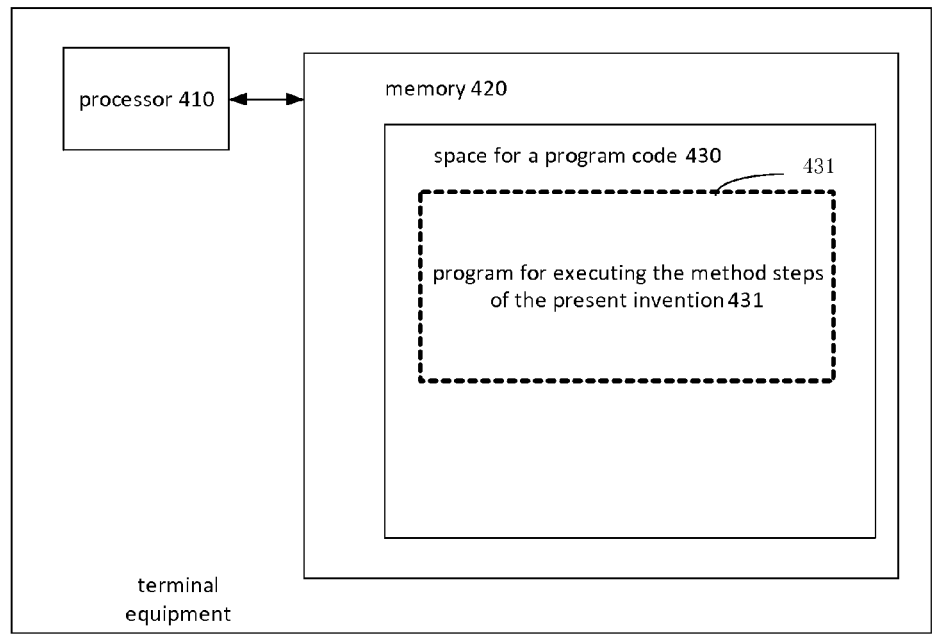
FIG. 4 schematically illustrates a block diagram of a terminal equipment for executing the switch method between the IE6 kernel and the new IE kernel according to the present invention.
Figure 5:
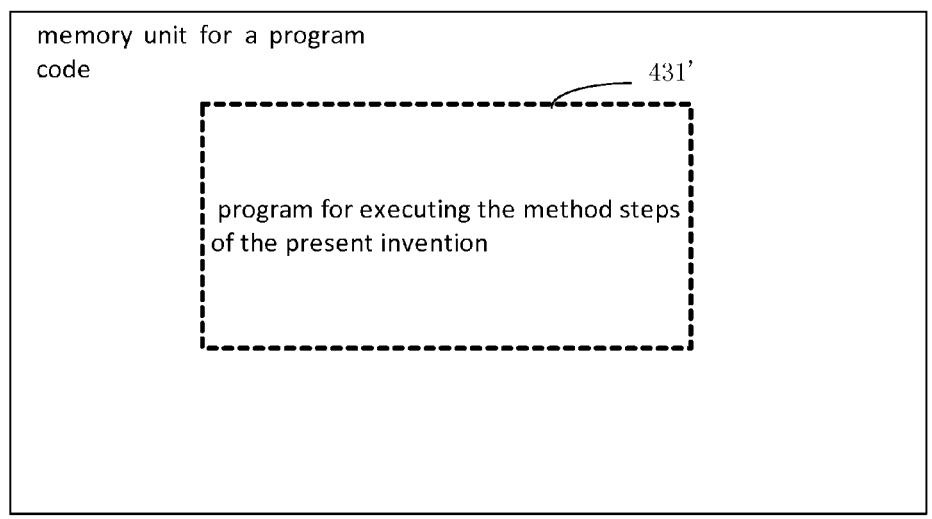
FIG. 5 schematically illustrates a memory unit for storing or carrying a program code for executing the switch method between the IE6 kernel and the new IE kernel according to the present invention.

For example, FIG. 4 schematically shows a block diagram of terminal equipment for executing the method for a browser to switch between IE kernels according to the present invention. Traditionally, the terminal equipment comprises a processor 410 and a computer program product or a computer readable medium in form of a memory 420. The memory 420 may be electronic memories such as flash memory, EEPROM (Electrically Erasable Programmable Read-Only Memory), EPROM, hard disk or ROM. The memory 420 has a memory space 430 for executing program codes 431 of any steps of the above methods. For example, the memory space 430 for program codes may comprise respective program code 431 used to implement the various steps in the above mentioned method. These program codes may be read from and/or be written into one or more computer program products. These computer program products comprise program code carriers such as hard disk, compact disk (CD), memory card or floppy disk. These computer program products are usually the portable or stable memory cells as shown in reference FIG. 4-A. The memory cells may be provided with memory sections, memory spaces, etc., similar to the memory 420 of the terminal equipment as shown in FIG. 4. The program codes may be compressed in an appropriate form. Usually, the memory cell includes computer readable codes 431' which can be read by processors such as 410. When these codes are operated by the server, the server may execute each step as described in the above method.

The terms "one embodiment", "an embodiment" or "one or more embodiment" used herein means that, the particular feature, structure, or characteristic described in connection with the embodiments may be included in at least one embodiment of the present invention. In addition, it should be noticed that, for example, the wording "in one embodiment" used herein is not necessarily always referring to the same embodiment.

A number of specific details have been described in the specification provided herein. However, it is possible to be understood that the embodiments of present invention may be practiced without these specific details. In some examples, in order not to confuse the understanding of the specification, the known methods, structures and techniques are not shown in detail.

It should be noticed that the above-described embodiments are intended to illustrate but not to limit the present invention, and alternative embodiments can be devised by the person skilled in the art without departing from the scope of claims as appended. In the claims, any reference symbols between brackets should not form a limit of the claims. The wording "comprising" does not exclude the presence of elements or steps not listed in a claim. The wording "a" or "an" in front of element does not exclude the presence of a plurality of such elements. The present invention may be achieved by means of hardware comprising a number of different components and by means of a suitably programmed computer. In the unit claim listing a plurality of devices, some of these devices may be embodied in the same hardware. The wordings "first", "second", and "third", etc. do not denote any order. These wordings can be interpreted as a name.

It should also be noticed that the language used in the present specification is chosen for the purpose of readability and teaching, rather than selected in order to explain or define the subject matter of the present invention. Therefore, it is obvious for an ordinary skilled person in the art that modifications and variations could be made without departing from the scope and spirit of the claims as appended. For the scope of the present invention, the disclosure of present invention is illustrative but not restrictive, and the scope of the present invention is defined by the appended claims.

The invention claimed is:

1. A method for a browser to switch an INTERNET EXPLORER (IE) kernel, comprising:
   generating a first IE kernel file and a second IE kernel file, and importing them into a browser client, wherein the first IE kernel file is an IE6 kernel file and includes a dynamic link library (DLL) of a IE6 kernel, a data file of the IE6 kernel, a language pack file of the IE6 kernel, and a registry configuration file of the IE6 kernel, wherein the second IE kernel file is an IE8 kernel file or a higher version IE kernel file and includes a DLL of a IE8 kernel or a higher version IE kernel, a data file of the IE8 kernel or the higher version IE kernel, a language pack file of the IE8 kernel or the higher version IE kernel, and a registry configuration file of the IE8 kernel or the higher version IE kernel;

determining, by a browser process, a currently adapted IE kernel version according to Uniform Resource Locator (URL) information submitted by a user;

in response to a determination that the currently adapted IE kernel version is the IE6 kernel, redirecting the browser process to a corresponding location to load the IE6 kernel file; and in response to a determination that the currently adapted IE kernel version is the IE8 kernel or a higher version IE kernel, redirecting the browser process to a corresponding location to load the IE8 kernel file or the higher version IE kernel file.

2. The method of claim 1, wherein the step of generating a first kernel file and a second kernel file, and importing them into a browser client comprises:

extracting a DLL of the IE6 kernel from the IE6 kernel, and extracting a DLL of the IE8 kernel or the higher version IE kernel from the IE8 kernel or the higher version IE kernel;

generating a data file and the language pack file of the IE6 kernel, and a data file and a language pack file of the IE8 kernel or the higher version IE kernel, through debug and analysis;

installing the DLL, the data file and the language pack file of the IE6 kernel, and the DLL, the data file and the language pack file of the IE8 kernel or the higher version IE kernel to a specified location in the browser client; and generating a registry configuration file of the IE6 kernel, and a registry configuration file of the IE8 kernel or the higher version IE kernel, and importing them into a registry of the browser client.

3. The method of claim 2, wherein the step of extracting the DLL of the IE6 kernel from the IE6 kernel, and extracting the DLL of the IE8 kernel or the higher version IE kernel from the IE8 kernel or the higher version IE kernel comprises:

reloading all the system application program interfaces (API) related to IE6 kernel loading;

acquiring all the DLLs loaded by a browser by monitoring a DLL checking interface;

excluding an underlying DLL of a system, and extracting the DLL of the IE6 kernel; and reloading all the system APIs related to the IE8 kernel or the higher version IE kernel;

acquiring all the DLLs loaded by the browser by monitoring a DLL checking interface;

excluding the underlying DLL of the system, and extracting the DLL of the IE8 kernel or the higher version IE kernel.

4. The method of claim 1, wherein the step of determining, by a browser process, a currently adapted IE kernel version according to URL information submitted by a user comprises:

if the current URL information submitted by the user is an LAN address, determining that the currently adapted IE kernel version is the IE6 kernel;

if the current URL information submitted by the user comprises an IP address, determining that the currently adapted IE kernel version is the IE6 kernel; and if the current URL information submitted by the user is included in a list of a compatible domain name of the IE8 kernel or the higher version IE kernel, determining that the currently adapted IE kernel version is the IE8 kernel or the higher version IE kernel.

5. The method of claim 1, wherein the step of redirecting the browser process to a corresponding location to load the first IE kernel file comprises:

when monitoring that the browser process accesses a registry, if an IE configuration item is accessed, booting the browser process to read and write the registry configuration file of the IE6 kernel; if a path of an IE kernel file is queried, returning information of a client specified location imported by the IE6 kernel file;

when monitoring that the browser process accesses a DLL, based on a version number of the currently adapted IE6 kernel, positioning to the client specified location imported by the corresponding IE6 kernel file and searching a DLL having the same name in the location; if it is found, booting the browser process to load the DLL;

when monitoring that the browser process accesses a data file and a language pack file, according to the version number of the currently adapted IE6 kernel, positioning to the client specified location imported by the corresponding IE6 kernel file and searching the data file and the language pack file having the same name in the location; if it is found, booting the browser process to load the data file and the language pack file;

when monitoring that the browser process creates a COM object, searching a DLL implementing the COM object from the registry of the client, and then calling the step when monitoring that the browser process accesses the DLL; and when monitoring that the browser process accesses a DLL kernel handle, calling the step when monitoring that the browser process accesses the DLL.

6. The method of claim 1, wherein the step of redirecting the browser process to a corresponding location to load the second IE kernel file comprises:

when monitoring that the browser process accesses a registry, if an IE configuration item is accessed, booting the browser process to read and write the registry configuration file of the IE8 kernel or the higher version IE kernel; if a path of the IE kernel file is queried, returning information of a client specified location imported by the IE8 kernel file or the higher version IE kernel file;

when monitoring that the browser process accesses the DLL, based on the currently adapted IE8 kernel or the higher version IE kernel, positioning to a client specified location imported by a corresponding IE8 kernel file or the higher version IE kernel file, and searching a DLL having the same name in the location; if found, booting the browser process to load the DLL;

when monitoring that the browser process accesses a data file and a language pack file, according to the currently adapted IE8 kernel or the higher version IE kernel, positioning to the client specified location imported by a corresponding IE8 kernel file or the higher version IE kernel file, and searching a data file and a language pack file having the same name in the location; if found, booting the browser process to load the data file and the language pack file;

when monitoring that the browser process creates a COM object, searching a DLL implementing the COM object from the registry of the client, and then calling the step when monitoring that the browser process accesses a DLL;

when monitoring that the browser process accesses a DLL kernel handle, calling the step when monitoring that the browser process accesses a DLL.

7. The method of claim 1, further comprises:
writing the IE6 kernel file and IE8 kernel file or the higher version IE kernel file in a memory; then
the step of redirecting the browser process to a corresponding location to load the first IE kernel file comprises:
redirecting the browser process to a corresponding location in the memory to load the IE6 kernel file;
the step of redirecting the browser process to a corresponding location to load the second IE kernel file comprises:
redirecting the browser process to a corresponding location in the memory to load the IE8 kernel file or the higher version IE kernel file.

8. A system for a browser to switch an INTERNET EXPLORER (IE) kernel, comprising:
a processor; and
a memory communicatively coupled to the processor to configure the processor at least to: generate a first kernel file and a second IE kernel file, and import them into a client, wherein the first IE kernel file is an IE 6 kernel file and includes a dynamic link library (DLL) of a IE6 kernel, a data file of the IE6 kernel, a language pack file of the IE6 kernel, and a registry configuration file of the IE6 kernel, wherein the second IE kernel file is an IE8 kernel file or a higher version IE kernel file and includes a DLL of a IE8 kernel or a higher version IE kernel, a data file of the IE8 kernel or the higher version IE kernel, a language pack file of the IE8 kernel or the higher version IE kernel, and a registry configuration file of the IE8 kernel or the higher version IE kernel;
determine a currently adapted IE kernel version by the browser process according to Uniform Resource Locator (URL) information submitted by a user,
redirect the browser process to a corresponding location to load the IE6 kernel file when the currently adapted IE kernel version is the IE6 kernel; and
redirect the browser process to a corresponding location to load the IE8 kernel file or the higher version IE kernel file when the currently adapted IE kernel version is the IE8 kernel or a higher version IE kernel.

9. The system of claim 8, the memory further configuring the processor at least to:
extract a DLL of the IE6 kernel from the IE6 kernel, and extract a DLL of the IE8 kernel or the higher version IE kernel from the IE8 kernel or the higher version IE kernel;
generate a data file and a language pack file of the IE6 kernel, and a data file and a language pack file of the IE8 kernel or the higher version IE kernel, through debug and analysis;
install the DLL, the data file and the language pack file of the IE6 kernel, and the DLL, the data file and the language pack file of the IE8 kernel or the higher version IE kernel to a specified location in the client; and
generate a registry configuration files of the IE6 kernel and a IE8 kernel or the higher version IE kernel, and import them into the registry of the client.

10. The system of claim 9, the memory further configuring the processor at least to:
reload a system application program interface related to IE6 kernel loading;
acquire all the DLLs loaded by the browser by monitoring a DLL checking interface;
exclude an underlying DLL of the system, and extract the DLL of the IE6 kernel; and
reload the system application program interface related to IE8 or higher version kernel loading;
acquire all the DLLs loaded by the browser by monitoring a DLL checking interface;
exclude the underlying DLL of the system, and extract the DLL of the IE8 kernel or the higher version IE kernel.

11. The system of claim 8, the memory further configuring the processor at least to:
determine that the currently adapted IE kernel version number is the IE6 kernel when the current URL information submitted by the user is an LAN address; or
determine that the currently adapted IE kernel version number is the IE6 kernel when the current URL information submitted by the user comprises an IP address; or
determine that the currently adapted IE kernel version is the IE8 kernel or the higher version IE kernel when the current URL information submitted by the user is included in a list of a IE8 or higher version kernel compatible domain name.

12. The system of claim 8, the memory further configuring the processor at least to:
when monitoring that the browser process accesses a registry, if an IE configuration item is accessed, boot the browser process to read and write the registry configuration file of the IE6 kernel; if a path of an IE kernel file is queried, return information of the client specified location imported by the IE6 kernel file; or
when monitoring that the browser process accesses a DLL, based on the currently adapted IE6 kernel version number, position to a client specified location imported by a corresponding IE6 kernel file, and search a DLL having the same name in the location; if found, boot the browser process to load the DLL; or
when monitoring that the browser process accesses a data file and a language pack file, according to the currently adapted IE6 kernel version number, position to a client specified location imported by a corresponding IE6 kernel file and search the data file and language pack file having the same name in the location; if found, boot the browser process to load the data file and the language pack file; or
when monitoring that the browser process creates a COM object, search a DLL implementing the COM object from the registry of the client, and then call the first DLL operation sub-module; or
when monitoring that the browser process accesses a DLL kernel handle, call the first DLL operation sub-module.

13. The system of claim 8, the memory further configuring the processor at least to:
when monitoring that the browser process accesses a registry, if an IE configuration item is accessed, boot the browser process to read and write the registry configuration file of the IE8 kernel or the higher version IE; if a path of IE kernel file is queried, return the information of the client specified location imported by the IE8 kernel file or the higher version IE kernel file; or
when monitoring that the browser process accesses a DLL, based on the currently adapted IE8 or higher kernel version number, position to the client specified location imported by a corresponding IE8 kernel file or the higher version IE kernel file and search a DLLs having the same name in the location; if found, boot the browser process to load the DLL; or when monitoring that the browser process accesses a data file and a language pack file, according to the currently adapted IE8 or higher kernel version number, position to a client specified location imported by a corresponding IE8 kernel file or the higher version IE kernel file and search a data file and a language pack file having the same name in the location; if found, boot the browser process to load the data file and the language pack file; or when monitoring that the browser process creates a COM object, search a DLL implementing the COM object from the registry of the client, and then call the second DLL operation sub-module; or a second DLL kernel handle operation sub-module, configured to, when monitoring that the browser process accesses a DLL kernel handle, call the second DLL operation sub-module.

14. The system of claim 8, the memory further configuring the processor at least to:

write the IE6 kernel file and the IE8 kernel file or the higher version IE kernel file in a memory space; wherein the corresponding location to which the browser process is redirected is the corresponding location in the memory space.

15. A non-transitory computer readable storage medium bearing computer readable instructions that upon execution on a computing device cause the computing device at least:

generating a first INTERNET EXPLORER (IE) kernel file and a second IE kernel file, and importing them into a browser client, wherein the first IE kernel file is an IE6 kernel file and includes a dynamic link library (DLL) of a IE6 kernel, a data file of the IE6 kernel, a language pack file of the IE6 kernel, and a registry configuration file of the IE6 kernel, wherein the second IE kernel file is an IE8 kernel file or a higher version IE kernel file and includes a DLL of a IE8 kernel or a higher version IE kernel, a data file of the IE8 kernel or the higher version IE kernel, a language pack file of the IE8 kernel or the higher version IE kernel, and a registry configuration file of the IE8 kernel or the higher version IE kernel;

determining, by a browser process, a currently adapted IE kernel version according to Uniform Resource Locator (URL) information submitted by a user;

in response to a determination that the currently adapted IE kernel version is the IE6 kernel, redirecting the browser process to a corresponding location to load the IE6 kernel file; and in response to a determination that the currently adapted IE kernel version is the IE8 kernel or a higher version IE kernel, redirecting the browser process to a corresponding location to load the IE8 kernel file or the higher version IE kernel file.

* * * * *